March 13, 1962 R. L. WHITE 3,025,409

LOGIC CIRCUITS OR THE LIKE

Filed Aug. 13, 1958 2 Sheets-Sheet 1

INVENTOR.
RICHARD L. WHITE
BY [signature]
ATTORNEY

March 13, 1962 R. L. WHITE 3,025,409

LOGIC CIRCUITS OR THE LIKE

Filed Aug. 13, 1958 2 Sheets-Sheet 2

INVENTOR.
RICHARD L. WHITE

BY [signature]

ATTORNEY

United States Patent Office 3,025,409

Patented Mar. 13, 1962

3,025,409

LOGIC CIRCUITS OR THE LIKE

Richard L. White, Skokie, Ill., assignor to Hoffman Electronics Corporation, a corporation of California Filed Aug. 13, 1958, Ser. No. 754,832
9 Claims. (Cl. 307—88)

This invention relates to improvements in logic circuits for automatic computers and, more particularly, to magnetic amplifier logic circuits which provide a maximum reliability of performance with a minimum of circuitry.

The heart of the automatic digital computer lies in the logic circuits. Until recently the most common form of logic circuitry has utilized vacuum tubes or relays. These components are, however, of limited reliability and, because of the vast number of logic circuits utilized in a single computer, have posed a serious problem of computer maintenance. This maintenance or "down" time can be very serious from an economic standpoint since the cost of a large scale computer is very great and it must be utilized a large number of hours per day in order to justify the initial investment in the computer.

Recently there has been a trend towards the use of transistors and magnetic amplifiers to replace vacuum tubes and relays used in the earlier computers. A much higher degree of reliability can be attained and maintenance costs can be materially reduced by the use of these relatively new components. In logic circuits the magnetic amplifier is used as a binary element in that it exhibits at its output either pulses which are being fed into the amplifier or, ideally, no output signal at all. The first condition is known as producing "ones" and the second condition is known as producing "zeros." Because many of these elements are normally cascaded to achieve a desired computer capability, it is essential that the ratio between the "one" condition and the "zero" condition be very high, preferably infinite. Thus, no false actuation of succeeding circuits will occur. Unfortunately, with the magnetic amplifier logic circuits used to date this goal has not been achieved. The cause for this failure is the flowing of a magnetizing current from the secondary of one magnetic amplifier through the primary of the succeeding amplifier. Unless special precautions are taken, this magnetizing current may produce false "ones" at the input to the succeeding stage and cause malfunctioning of the computer.

Therefore, it is an object of this invention to provide a magnetic amplifier logic circuit which provides a high degree of accuracy.

It is a further object of this invention to provide a magnetic amplifier logic circuit which exhibits a high ratio between the output from the logic circuit obtained for "ones" and that obtained for "zeros."

It is a still further object of this invention to provide a magnetic amplifier logic circuit which provides a high ratio between "one" pulses and "zero" pulses with a minimum of circuit components.

According to the present invention, the semiconductor diodes connected in series with the input circuits to the magnetic amplifier elements are operated as Zener diodes rather than as forward diodes, the Zener breakdown voltage of such diodes being chosen so as to exceed the voltage level normally achieved by "zero" pulses but lower than the amplitude achieved by "one" pulses, thus achieving a high degree of discrimination between those two types of pulses and providing a very high value for the so-called "zero to one" ratio.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which, FIGURE 1 is a schematic diagram of two cascaded magnetic amplifier logic circuits of the prior art.

Figures 1, 2, 3:
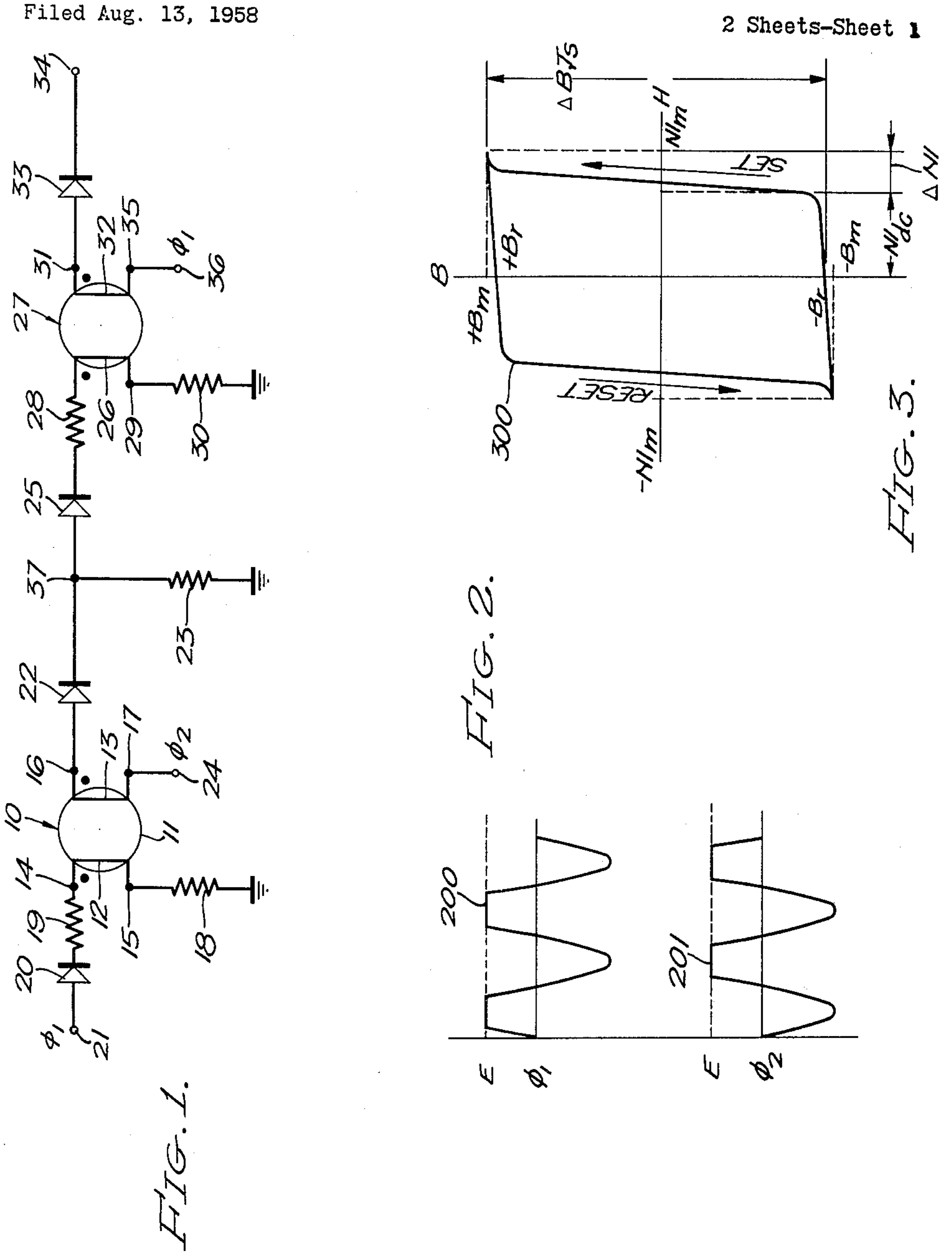
FIGURE 2 is a graphic representation of the voltages applied to magnetic amplifier logic circuits.
FIGURE 3 is a diagram showing the various conditions of operation for the magnetic amplifiers.

In FIGURE 1, magnetic amplifier 10 includes saturable core 11, primary 12 and secondary 13. Core 11 is in the form of a bobbin made of ceramic material or stainless steel upon which are wound several layers of ultra-thin magnetic material such as 4–79Mo-Permalloy material. This material has a high squareness ratio, i.e., the remanent flux density $B_r$ closely approaches the magnetizing flux density $B_m$. These two factors can be seen graphically in FIGURE 3. The material further has a low coercive force, $NI_m$, and a large flux density change $\Delta B$ from the set to the reset condition, as can be seen from FIGURE 3. Primary 12 and secondary 13 are then wound on the core with due consideration being given to the switching time which is required and the switching voltage which is available. Primary 12 terminates in terminal 14 and terminal 15. Secondary 13 terminates in terminal 16 and terminal 17. Terminal 15 is connected to ground through resistor 18. Terminal 14 is connected through resistor 19 and diode 20, which is operating in the forward direction, to input terminal 21. Secondary 13 has its terminal 16 coupled through diode 22 to load resistor 23 which has its remote end grounded. Terminal 17 of secondary 13 is connected to power input terminal 24. Diode 22 is also connected to diode 25 which is connected to operate in its forward direction. Diode 25 is coupled to primary 26 of the succeeding magnetic amplifier 27 through resistor 28. Terminal 29 of primary 26 is coupled to ground through resistor 30. Terminal 31 of secondary 32 is coupled through diode 33 to output terminal 34. Terminal 35 of secondary 32 is coupled to power input terminal 36.

The circuit of FIGURE 1 operates as follows. A pulse having the polarity of pulse 200 in FIGURE 2 when applied to input terminal 21 will cause current to flow through diode 20, resistor 19, primary 12 and resistor 18 to ground and, if of sufficient amplitude, will produce saturation of magnetic core 11. This action is described as a reset action and is shown in FIGURE 3. It drives the flux density to $-B_m$ on curve 300 of FIGURE 3 and upon the removal of pulse 200 the flux falls to the remanent amount shown as $-B_r$ in FIGURE 3.

Pulse 201 in FIGURE 2 is part of a pulse train which has a 180° phase relationship with respect to the pulse train of which pulse 200 forms a part. This can be seen from FIGURE 2. The phase of the pulse train of which pulse 200 is a part is assigned the designation $\phi_1$ and the phase of the pulse train of which pulse 201 forms a part is assigned the designation $\phi_2$. With core 11 having been reset by pulse 200, the arrival of pulse 201 at terminal 24 tends to produce magnetization in the opposite direction because the flux vector is reversed. Thus the application of pulse 201 tends to drive the flux density in core 11 from a value $-B_r$ to a value $+B_m$, as shown in FIGURE 3. This is known as the "setting" action within the core and the effective resistance of secondary 13 during this process is very high, the equation for the effective resistance of the winding having a factor ΔB in the numerator. As a result, practically the entire pulse voltage drop occurs across secondary 13 and very little voltage appears across load resistor 23. As long as pulses of the type 200 having the phase shown in FIGURE 2 occur at input terminal 21, pulses 201 will be absorbed in driving core 11 from the reset to the set condition shown in FIGURE 3 and the output appearing across load 23 will be a series of fairly small pulses which will be known as "zeros." However, if pulses 200 are no longer applied to input terminal 21, pulses 201 will drive the core 11 first to the saturated condition and then, during the negative portion of the pulse train, the flux density will fall to $+B_r$. Each succeeding positive pulse 201 will drive core 11 far into saturation and, because of the squareness of the hysteresis curve of FIGURE 3, and the fact that ΔB in the equation for the effective resistance of secondary 13 will be very small, the voltage drop across secondary 13 will be very small and substantially the entire amplitude of pulses 201 will appear across load resistor 23. The circuit in this condition is referred to as putting out a series of "ones." The amplitude of the pulses appearing across load 23 during the "ones" condition relative to the amplitude of the pulses appearing across load 23 in the "zeros" condition is sometimes referred to as the "zero to one" ratio as has been indicated, and it is desirable that the "ones" pulses be much greater than the "zeros" pulses in order to prevent false actuation of succeeding magnetic amplifiers. In the circuit of FIGURE 1 the polarity of diodes 22 and 25 is such that both the "zero" pulses and the "one" pulses are applied to primary 26 of magnetic amplifier 27. A large part of the magnetization current for secondary 13 of amplifier 10 will tend to flow through primary 26. As a result, the number of turns which can be placed on primary 26 must be materially reduced from the number of turns on secondary 13 in order to prevent resetting of the core of magnetic amplifier 27 by the unwanted "zero" pulses from magnetic amplifier 10. By reducing the number of turns on primary 26 to prevent false resetting of magnetic amplifier 27, the requirement for desired resetting current is increased proportionately. This results in a reduction in the efficiency of operation of magnetic amplifier 27. It is highly desirable to eliminate this situation and various attempts have been made to do so as by providing a current sink between point 37 and ground through the use of a diode biased into conduction by an external bias source. This results in increased complexity for the circuit and lowered efficiency.

Figure 4:
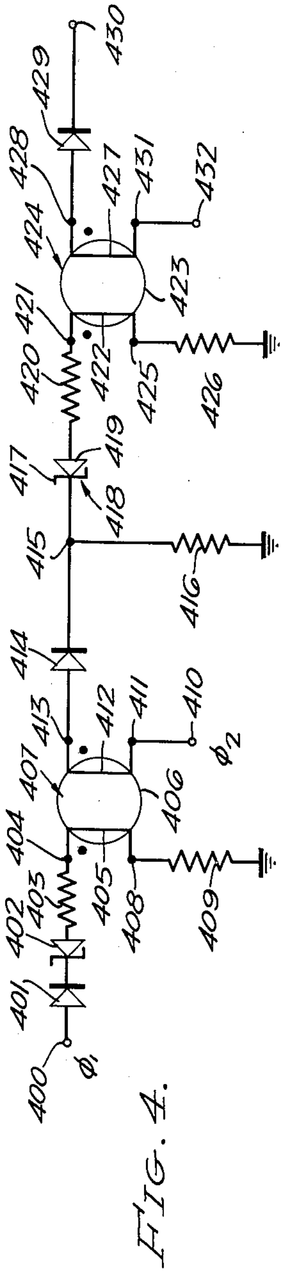
FIGURE 4 is a schematic diagram showing two cascaded magnetic amplifier logic circuits according to the present invention.
Figure 5:
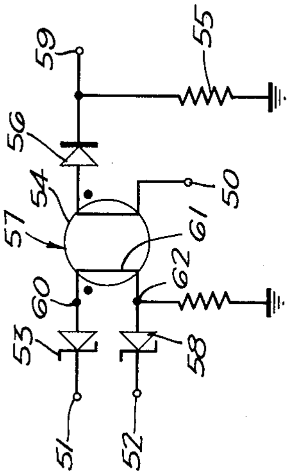
FIGURE 5 is a circuit diagram of a basic "building block" magnetic amplifier logic circuit according to the present invention.

To overcome this complexity the fundamental circuits of FIGURES 4 and 5 were conceived. In FIGURE 4 pulses of opposite phases $\phi_1$ and $\phi_2$ are derived from a power oscillator, which may be transistorized. The pulses of $\phi_1$ are applied to input terminal 400 and diodes 401 and 402 and through resistor 403 to input terminal 404 of primary 405 on core 406 of magnetic amplifier 407. Primary 405 has an additional terminal 408 which is coupled through resistor 409 to ground. Power input terminal 410 is coupled to a first terminal 411 of secondary 412 on magnetic amplifier 407. The remaining terminal 413 of secondary 412 is coupled through diode 414 to junction 415 with resistor 416, the remote end of which is grounded. Junction 415 is connected to cathode 417 of Zener diode 418 the anode 419 of which is coupled through resistor 420 to input 421 of primary 422 on core 423 of magnetic amplifier 424. The remaining terminal 425 of primary 422 is coupled through resistor 426 to ground. Secondary 427 has output terminal 428 coupled through forward diode 429 to output terminal 430. It further has secondary terminal 431 connected to power terminal 432.

The inclusion of Zener diodes 402 and 418 effects a very important change in the performance of the circuit of FIGURE 4 over that of FIGURE 1. It has been known for some time that if a semiconductor diode has a negative potential applied to its anode and a positive potential applied to its cathode, current will not flow until a breakdown point is reached, since the diode is operating in a reverse direction. This breakdown point has variously been referred to as the reverse breakdown point and the Zener point for the diode. With special effort the Zener breakdown phenomenon can be made a very sharp one requiring a very short time from zero current flow to a large current flow. The assignee of the subject invention has long specialized in the production of Zener diodes for various exacting applications such as voltage regulation. By the choice of diodes with the proper Zener breakdown voltages, voltage pulses corresponding to "ones" can be permitted to pass with little loss of amplitude whereas pulses corresponding to "zeros" will be incapable of causing Zener breakdown and, hence, will not appear at all in the output from the logic circuit. Thus, an extremely high zero to one ratio can be obtained. The magnetization current for secondary 412 of amplifier 407 will flow entirely through load resistor 416 and will produce a pulse of insufficient amplitude to break down input Zener diode 418. Thus there is no chance of producing false "ones" at the primary 422 of magnetic amplifier 424.

In FIGURE 5 a fundamental building block for forming magnetic amplifier logic circuits and utilizing the Zener diodes to obtain high zero to one ratios is shown. In FIGURE 5 pulse power from an external source such as a transistorized power oscillator is applied to power input terminal 50. These pulses are of the first phase. Control pulses of an opposite phase are applied to input terminals 51 and 52 in a sequence determined by circuitry preceding this logic circuit. The pulses applied to terminals 51 and 52 are of positive sign. If no pulse is applied to terminal 51, or if a pulse of insufficient amplitude to break down Zener diode 53 is applied, positive pulses applied to terminal 50 will drive core 54 to a saturated condition and then substantially the entire positive pulse will appear across load resistor 55. Diode 56 eliminates any negatively directed pulses from appearing across output load resistor 55.

If a "one" pulse is applied to terminal 51 and has sufficient amplitude to break down Zener diode 53, core 54 of magnetic amplifier 57 will be driven to the reset condition and the next succeeding positive pulse on terminal 50 will be absorbed in driving core 54 to the set condition so that that positive pulse will not appear across output load resistor 55, and a "zero" output will occur.

If positive pulses of the same phase are applied to terminals 51 and 52 and have sufficient amplitude to break down Zener diodes 53 and 58, respectively, the existence of the pulse on terminal 52 will prevent resetting of core 54 by the positive pulse on terminal 51 and one-half period later a positive pulse will appear across resistor 55 and, hence, at output terminal 59. Thus, if an input pulse does not appear at 51 or does appear at 51 and 52 simultaneously, there will be an output pulse from terminal 59. Zener diode 58 is chosen to have a lower breakdown voltage than Zener diode 53. For example, diode 58 may have a Zener voltage of 6.2 to 6.6 volts, whereas diode 53 may have a Zener voltage of 7.4 to 7.8 volts. Thus, diode 58 will conduct before diode 53 and prevent resetting of core 54 by the pulse at terminal 51. If, for simplification, terminal 51 is designated as A, input terminal 52 is designated as B and output terminal 59 is designated as C, the Boolean equation for this logic circuit can be written as $\bar{A}+B=C$. Literally this can be recited as being "not $A$ or $B=C$."

The circuit of FIGURE 5 can be converted into any one of a number of logic circuits which will possess the fundamental advantage provided by this invention, namely, high zero to one ratio. For example, by eliminating input terminal 52 and Zener diode 58 and coupling a plurality of Zener diodes to input terminal 60 of primary 61 on magnetic amplifier 57, a "not and" logic circuit is derived. By coupling a plurality of Zener diodes instead of the single Zener diode 58 to input terminal 62 of primary 61, an "or" circuit is derived. By cascading two of the fundamental circuits of FIGURE 5 and feeding pulses from the output terminal to one of the input terminals, a bistable circuit can be achieved. This is described more fully in connection with FIGURE 6.

Figure 6:
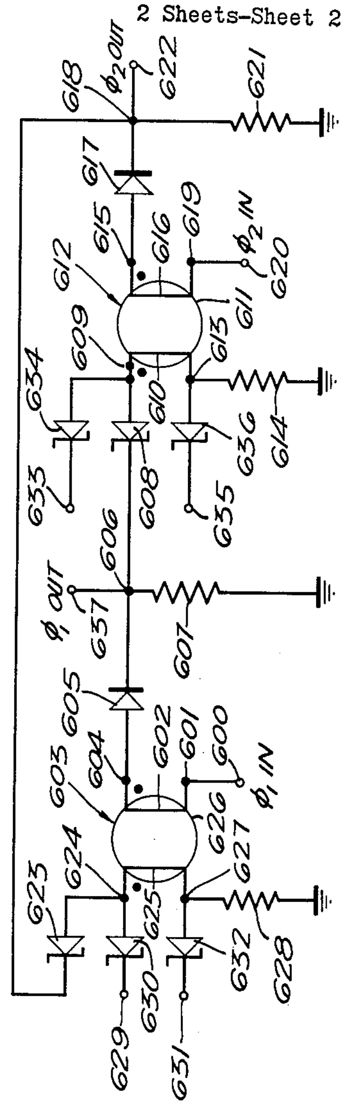
FIGURE 6 is a schematic diagram of a bistable magnetic amplifier logic circuit according to the present invention.

In FIGURE 6, pulse power of a first phase is fed to input terminal 600 which is connected to terminal 601 on secondary 602 of magnetic amplifier 603. The remaining terminal 604 of secondary 602 is connected to diode 605 which is operated in a forward direction and the output of which is coupled to junction 606. Junction 606 is coupled to ground through resistor 607 and is coupled through Zener diode 608 to input terminal 609 of primary 610 on core 611 of magnetic amplifier 612. Terminal 613 of primary 610 is coupled through resistor 614 to ground. Output terminal 615 of secondary 616 is coupled through forward diode 617 to junction 618. Terminal 619 of secondary 616 is coupled to pulse power input terminal 620 to which pulse power having a phase opposite to that applied to input terminal 600 is applied. Junction 618 is coupled to ground through load resistor 621. It is also coupled to output terminal 622 at which "ones" or "zeros" of phase "2" may be derived depending upon the existence or absence of pulses at input terminals 609 and 613 of primary 610. Junction 618 is also coupled through Zener diode 623 to input terminal 624 of primary 625 on core 626 of magnetic amplifier 603. Terminal 627 of primary 625 is coupled through resistor 628 to ground. Reset terminal 629 is coupled through Zener diode 630 to input terminal 624 on primary 625. Set terminal 631 is coupled through Zener diode 632 to terminal 627 on primary 625. Phase "1" reset terminal 633 is coupled through Zener diode 634 to input terminal 609 on primary 610 of magnetic amplifier 612. Phase "1" set terminal 635 is coupled through Zener diode 636 to terminal 613 on primary 610 of magnetic amplifier 612.

The circuit of FIGURE 6 operates as follows. Assume that no "one" pulses are appearing at input terminal 624 of primary 625. Then positive pulses of a first phase appearing at input terminal 600 will saturate core 626 of magnetic amplifier 603 and appear substantially undiminished in amplitude at junction 606 and at output terminal 637. These pulses will be of sufficient magnitude to break down Zener diode 608 thus applying pulses to primary 610 of magnetic amplifier 612. These pulses will successively reset core 611 of magnetic amplifier 612 as the pulses of a second phase applied to input terminal 620 attempt to set the core to a saturated condition in the opposite direction. Thus, pulses of very small amplitude corresponding to the magnetizing current for secondary 616 will appear at output terminal 622. These are what are known as "zeros" so that at output terminal 622 "zeros" will be obtained whereas at output terminal 637 "ones" will be obtained. The amplitude of the "zero" pulses will be insufficient to break down Zener diode 623 and this condition will continue until the condition at the primary of either magnetic amplifier 603 or magnetic amplifier 612 is changed. Thus, if a pulse of the second phase is applied to input terminal 629, the core 626 of amplifier 603 will be put in a reset condition and the next positive pulse appearing at terminal 600 in the first phase will be absorbed in setting core 603. The output from terminal 637 will be a "zero" and, hence, the input to primary 610 will be a "zero" permitting the positive pulse of phase "2" applied to terminal 620 to appear at output terminal 622. This same pulse will be sufficient to break down Zener diode 623 and will appear at terminal 624 of primary 625, thus causing a series of "zeros" to appear at output terminal 637 and a series of "ones" to appear at the output terminal 622. This is the second stable condition which this circuit can maintain. To return the circuit to the original condition in which "ones" were appearing at the output terminal 637 and "zeros" were appearing at the output terminal 622, a pulse of the same phase as that applied to 629 can be applied to terminal 631 and will break down Zener diode 632 and counteract the pulse applied to terminal 624 with the result that the succeeding pulse of the first phase applied to terminal 600 will appear at output terminal 637, the input pulses at terminal 620, of a second phase, will be gated off and a series of "zeros" will appear at the output terminal 622. A corresponding shifting back and forth from one stable condition to the other can be achieved by applying pulses of a first phase to input terminals 633 and 635. Once again, by the ingenious use of Zener diodes in the input circuits to the magnetic amplifiers "zero" pulses are simply and reliably prevented from producing false "ones" and unreliable operation of the logic circuit. Stated positively, the use of Zener diodes instead of conventional forward diodes provides a simpler and more reliable logic circuit thus assuring over-all reliability and low maintenance for the computer in which the logic circuit is utilized.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A magnetic amplifier including: a saturable core having a substantially rectangular hysteresis curve characteristic; a primary winding carried by said core for coupling said core to the output of a preceding magnetic amplifier stage; a secondary winding carried by said core; an input terminal; and a Zener diode coupled between said primary winding and said terminal to allow said primary winding to receive an input when said preceding stage is in a binary "one" condition, and to prevent said primary winding from receiving an input when said preceding stage is in a binary "zero" condition.

2. A magnetic amplifier including: a saturable core having a substantially rectangular hysteresis curve characteristic; a primary winding having first and second terminals; a secondary winding having first and second terminals; a control signal input terminal for said amplifier; and a Zener diode coupled between said control signal input terminal and said first terminal of said primary winding to provide a high ratio of "zero" to "one" discrimination.

3. A magnetic amplifier including: a saturable core having a substantially rectangular hysteresis curve characteristic; a primary winding having first and second connecting points; a secondary winding having first and second connecting points; first and second input terminals; a first Zener diode coupled between said first input terminal and said first connecting point of said primary and a second Zener diode coupled between said second input terminal and said second connecting point of said primary.

4. Apparatus according to claim 3 in which said first Zener diode has a higher breakdown voltage than said second Zener diode.

5. A magnetic amplifier including a saturable core having a substantially rectangular hysteresis curve characteristic; a primary winding on said core and having first and second connecting points; a secondary winding on said core and having first and second connecting points; first and second input terminals; a first Zener diode coupled between said first input terminal and said first connecting point of said primary; a second Zener diode coupled between said second input terminal and said second connecting point of said primary; an output terminal;

and a forward-operating diode coupled between said first connecting point on said secondary winding and said output terminal.

6. Apparatus according to claim 5 in which said first Zener diode has a higher breakdown voltage than said second Zener diode.

7. A magnetic amplifier including: a saturable core having a substantially rectangular hysteresis curve characteristic; a primary winding having first and second terminals; a secondary winding having first and second terminals; first and second control signal input terminals; a first Zener diode coupled between said first control signal input terminal and said first terminal of said primary winding; a second Zener diode coupled between said second control signal input terminal and said second terminal of said primary winding; an output terminal; a resistor connected between said second terminal of said primary winding and ground potential; and a forward-operating diode coupled between said first terminal of said secondary winding and said output terminal.

8. Apparatus according to claim 7 in which said second Zener diode has a lower breakdown voltage than said first Zener diode.

9. A magnetic amplifier comprsing: first and second magnetic cores, each having a substantially rectangular hysteresis curve characteristic; first and second input windings on said first and second cores, respectively; first and second output windings on said first and second cores, respectively; and a Zener diode coupling said first output winding to said second input winding to allow said second input winding to receive an input when said first core is in a binary "one" condition, and to prevent said second input winding from receiving an input when said first core is in a binary "zero" condition.

References Cited in the file of this patent

UNITED STATES PATENTS

| | | |
|---|---|---|
| 2,695,993 | Haynes | Nov. 30, 1954 |
| 2,709,798 | Steagall | May 31, 1955 |
| 2,825,820 | Sims | Mar. 4, 1958 |
| 2,854,651 | Kirchee | Sept. 30, 1958 |
| 2,875,432 | Markow | Feb. 24, 1959 |
| 2,876,435 | Anderson | Mar. 3, 1959 |
| 2,892,103 | Scarbrough | June 23, 1959 |